US008582233B2

(12) United States Patent  
Fukushima

(10) Patent No.: US 8,582,233 B2  
(45) Date of Patent: Nov. 12, 2013

(54) MOTOR AND DISK DRIVE APPARATUS

(71) Applicant: Nidec Corporation, Kyoto (JP)

(72) Inventor: Kazuhiko Fukushima, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/751,380

(22) Filed: Jan. 28, 2013

(65) Prior Publication Data

US 2013/0194701 A1 Aug. 1, 2013

Related U.S. Application Data

(60) Provisional application No. 61/593,492, filed on Feb. 1, 2012.

(51) Int. Cl.
*G11B 17/02* (2006.01)

(52) U.S. Cl.
USPC ........................................... 360/99.08

(58) Field of Classification Search
USPC ........... 360/99.08, 99.16, 97.12, 97.19, 97.22
See application file for complete search history.

(56) References Cited

U.S. PATENT DOCUMENTS

| | | | |
|---|---|---|---|
| 5,533,811 A | 7/1996 | Polch et al. | |
| 5,558,443 A | 9/1996 | Zang | |
| 6,211,592 B1 | 4/2001 | Ichiyama | |
| 6,246,136 B1 | 6/2001 | Ichiyama | |
| 6,698,931 B2 * | 3/2004 | Hino | 384/107 |
| 8,284,515 B2 * | 10/2012 | Sekii et al. | 360/99.08 |
| 2004/0090702 A1 | 5/2004 | Aiello et al. | |
| 2004/0096131 A1 | 5/2004 | Aiello et al. | |
| 2004/0156568 A1 | 8/2004 | Woldemar et al. | |
| 2004/0165797 A1 | 8/2004 | Oku et al. | |
| 2004/0175062 A1 | 9/2004 | Nishimura et al. | |
| 2005/0031237 A1 | 2/2005 | Gomyo et al. | |
| 2005/0111769 A1 | 5/2005 | Haga | |
| 2005/0225187 A1 | 10/2005 | Hafen et al. | |

(Continued)

FOREIGN PATENT DOCUMENTS

| | | |
|---|---|---|
| JP | 06-028335 U | 4/1994 |
| JP | 06-121484 A | 4/1994 |

(Continued)

OTHER PUBLICATIONS

Kimura et al., "Dynamic Pressure Bearing and Spindle Motor Using the Same", U.S. Appl. No. 12/952,223, filed Nov. 23, 2010.

(Continued)

*Primary Examiner* — Allen T Cao
(74) *Attorney, Agent, or Firm* — Keating & Bennett, LLP

(57) ABSTRACT

A spindle motor, which is for use in a disk drive apparatus which includes a housing including a base member and a cover member, includes a stationary portion and a rotating portion. The stationary portion includes a stationary shaft and the base member. The rotating portion includes a sleeve portion. The stationary shaft is inserted into the bearing hole. The stationary shaft includes an annular surface arranged to come into direct or indirect contact with the cover member, the annular surface being located higher than the sleeve portion and extending in a circumferential direction, and an upper protrusion arranged to be fixed to a cover inner circumferential surface defining a cover penetrating hole of the cover member, the upper protrusion protruding upward from the radial inner side of the annular surface. The base member includes a fixing portion arranged to directly or indirectly fix the cover member.

27 Claims, 12 Drawing Sheets

(56) References Cited

U.S. PATENT DOCUMENTS

| | | | |
|---|---|---|---|
| 2006/0002638 A1 | 1/2006 | Ichiyama | |
| 2006/0002641 A1 | 1/2006 | Ichiyama | |
| 2006/0039634 A1 | 2/2006 | Ichiyama | |
| 2006/0039636 A1 | 2/2006 | Ichiyama | |
| 2006/0051001 A1 | 3/2006 | Nishimura et al. | |
| 2006/0210205 A1 | 9/2006 | Engesser et al. | |
| 2006/0222276 A1 | 10/2006 | Uenosono | |
| 2007/0140606 A1 | 6/2007 | Feng et al. | |
| 2007/0154123 A1 | 7/2007 | Gomyo et al. | |
| 2007/0177832 A1 | 8/2007 | Gotoh et al. | |
| 2007/0211971 A1 | 9/2007 | Obara et al. | |
| 2008/0006332 A1 | 1/2008 | Ishizawa et al. | |
| 2008/0029212 A1* | 2/2008 | Tamaoka | 156/275.5 |
| 2008/0056104 A1 | 3/2008 | Nishimura et al. | |
| 2008/0218019 A1* | 9/2008 | Sumi | 310/90 |
| 2009/0129710 A1 | 5/2009 | Ito et al. | |
| 2009/0140587 A1 | 6/2009 | Popov et al. | |
| 2009/0140588 A1 | 6/2009 | Drautz et al. | |
| 2009/0279818 A1 | 11/2009 | Le et al. | |
| 2010/0124387 A1 | 5/2010 | Fuss et al. | |
| 2011/0123139 A1* | 5/2011 | Kimura et al. | 384/107 |
| 2011/0299193 A1* | 12/2011 | Sekii et al. | 360/99.08 |

FOREIGN PATENT DOCUMENTS

| | | |
|---|---|---|
| JP | 07-336924 A | 12/1995 |
| JP | 2002-005171 A | 1/2002 |
| JP | 2003-092867 A | 3/2003 |
| JP | 2003-244886 A | 8/2003 |
| JP | 2004-173377 A | 6/2004 |
| JP | 2005-048890 A | 2/2005 |
| JP | 2006-226388 A | 8/2006 |
| JP | 2009-041671 A | 2/2009 |
| JP | 2009-133361 A | 6/2009 |
| JP | 2011-002024 A | 1/2011 |
| WO | 2006/120719 A1 | 11/2006 |

OTHER PUBLICATIONS

Kimura et al., "Bearing Apparatus, Spindle Motor, and Disk Drive Apparatus", U.S. Appl. No. 12/791,147, filed Jun. 1, 2010.
Oe et al., "Bearing Apparatus, Spindle Motor, and Disk Drive Apparatus", U.S. Appl. No. 12/793,851, filed Jun. 4, 2010.
Yamada et al., "Fluid Dynamic Bearing Apparatus, Spindle Motor, and Disk Drive Apparatus", U.S. Appl. No. 12/742,931, filed May 14, 2010.
Yamada et al., "Fluid Dynamic Bearing Apparatus, Spindle Motor, and Disk Drive Apparatus", U.S. Appl. No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Kimura et al., "Bearing Apparatus, Spindle Motor, and Disk Drive Apparatus", U.S. Appl. No. 13/602,420, filed Sep. 4, 2012.
Kimura et al., "Bearing Apparatus, Spindle Motor, and Disk Drive Apparatus", U.S. Appl. No. 13/681,500, filed Nov. 20, 2012.
Kimura et al., "Bearing Apparatus, Spindle Motor, and Disk Drive Apparatus", U.S. Appl. No. 13/602,348, filed Sep. 4, 2012.
Iwasaki et al., "Motor and Disk Drive Apparatus", U.S. Appl. No. 13/613,109, filed Sep. 13, 2012.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Sekii et al., "Spindle Motor and Disk Drive Apparatus", U.S. Appl. No. 13/767,205, filed Feb. 14, 2013.
Sekii et al., "Bearing Apparatus, Spindle Motor, and Disk Drive Apparatus", U.S. Appl. No. 13/789,796, filed Mar. 8, 2013.
Sekii et al., "Bearing Apparatus, Spindle Motor, and Disk Drive Apparatus", U.S. Appl. No. 13/790,089, filed Mar. 8, 2013.
Sato et al., "Spindle Motor and Disk Drive Apparatus", U.S. Appl. No. 13/798,857, filed Mar. 13, 2013.
Sekii, "Moto and Disk Drive Apparatus", U.S. Appl. No. 13/886,290, filed May 3, 2013.
Watanabe et al., "Spindle Motor and Disk Drive Apparatus", U.S. Appl. No. 13/898,921, filed May 21, 2013.
Kimura et al., "Bearing Mechanism, Motor, and Disk Drive Apparatus", U.S. Appl. No. 13/775,475, filed Feb. 25, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
English translation of Official Communication issued in International Patent Application No. PCT/JP2009/059556, mailed on Jan. 20, 2011.

* cited by examiner

MOTOR AND DISK DRIVE APPARATUS

BACKGROUND OF THE INVENTION

1. Field of the Invention

The present invention relates to an electrically powered motor.

2. Description of the Related Art

In the past, a spindle motor that rotates a disk has been mounted on a hard disk drive apparatus. In a so-called fixed shaft type spindle motor, a double-sided support structure where a shaft is supported at both end portions is adopted. Such a spindle motor has a structure which has very high structural rigidity and is suitable for the demand for higher capacity in a hard disk drive apparatus. A fixed shaft type spindle motor disclosed in Japanese Patent Application Publication No. 2009-136143 includes a shaft, a rotor component, a bearing component, and a bottom plate.

The bottom plate has a central opening portion of a substantially cylindrical shape and the bearing component is accommodated therein. The bearing component is formed substantially in a cup shape and includes an opening portion at the center. The shaft is fixed to the opening portion of the bearing component. A radial bearing portion is defined between axially extending bearing surfaces of the shaft and the rotor component that face each other. Further, the shaft has a threaded hole for mounting it on the spindle motor or a housing lid of a hard disk drive at an upper end portion thereof. Then, in a hard disk drive apparatus on which the spindle motor as disclosed in Japanese Patent Application Publication No. 2009-136143 is mounted, the shaft is fixed to the housing lid by a screw. In such a hard disk drive apparatus, a portion in the vicinity of a threaded hole of the housing lid is recessed downward so that a flange portion of the screw does not protrude upward.

Incidentally, in a hard disk drive apparatus, a reduction in thickness is required in addition to higher capacity. However, in the hard disk drive apparatus on which the spindle motor disclosed in Japanese Patent Application Publication No. 2009-136143 is mounted, if attempting to secure the axial length of the radial bearing portion of the spindle motor, a reduction in thickness cannot be achieved.

SUMMARY OF THE INVENTION

A spindle motor according to aspect preferred embodiment of the present invention, which is useable in a disk drive apparatus which includes a housing which includes a base member and a cover member, includes a stationary portion, and a rotating portion which is rotatably supported with respect to the stationary portion, wherein the stationary portion includes a stationary shaft arranged along a central axis extending in the vertical direction, and the base member which directly or indirectly fixes the stationary shaft, the rotating portion includes a sleeve portion including an inner circumferential surface which defines a bearing hole penetrating in an axial direction, the stationary shaft is inserted into the bearing hole, a gap is defined between an outer circumferential surface of the stationary shaft and an inner circumferential surface of the sleeve portion, the gap is filled with lubricating oil, a dynamic pressure generating groove array is provided in at least one of the outer circumferential surface of the stationary shaft and the inner circumferential surface of the sleeve portion which define the gap, the stationary shaft includes an annular surface arranged to come into direct or indirect contact with the cover member, the annular surface being located higher than the sleeve portion and extending in a circumferential direction, and an upper protrusion arranged to be fixed to a cover inner circumferential surface defining a cover penetrating hole of the cover member, the upper protrusion protruding upward from the radial inner side of the annular surface, and the base member includes a fixing portion arranged to directly or indirectly fix the cover member.

A disk drive apparatus according to another preferred embodiment of the present invention includes a housing including a base member and a cover member, and a spindle motor, wherein the cover member includes a cover penetrating hole and a fixing portion which is fixed to the base member, the spindle motor includes a stationary portion, and a rotating portion which is rotatably supported with respect to the stationary portion, the stationary portion includes a stationary shaft which is arranged along a central axis extending in a vertical direction and is directly or indirectly fixed to the base member, the rotating portion includes a sleeve portion that includes an inner circumferential surface which defines a bearing hole penetrating in an axial direction, the stationary shaft is inserted into the bearing hole, a gap is defined between an outer circumferential surface of the stationary shaft and an inner circumferential surface of the sleeve portion, the gap is filled with lubricating oil, a dynamic pressure generating groove array is provided in at least one of the outer circumferential surface of the stationary shaft and the inner circumferential surface of the sleeve portion which define the gap, the stationary shaft includes an annular surface which is located higher than the sleeve portion and extends in a circumferential direction, and an upper protrusion protruding upward from the radial inner side of the annular surface, the annular surface is arranged to come into direct or indirect contact with the cover member, and the upper protrusion is fixed to a cover inner circumferential surface defining the cover penetrating hole of the cover member.

According to preferred embodiments of the present invention, a spindle motor can be provided which is suitable for achieving higher capacity and a reduction in the thickness of a hard disk drive apparatus. Further, a hard disk drive apparatus which includes the spindle motor can be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
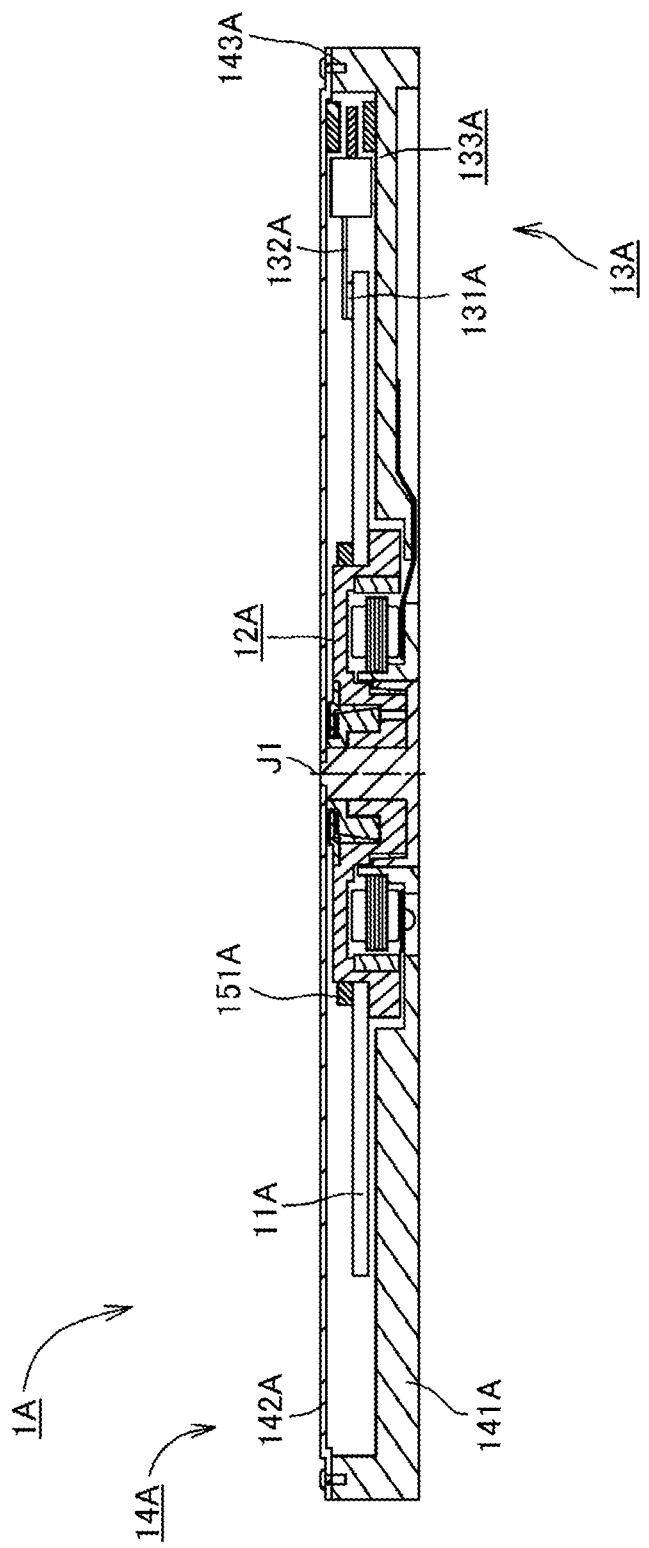
FIG. 1 is a cross-sectional view of a hard disk drive apparatus which includes a spindle motor according to an exemplary preferred embodiment of the present invention.

In this specification, the upper side of FIG. 1 in the direction of a central axis of a motor is simply referred to as an "upper side" and the lower side is simply referred to as a "lower side". In addition, a vertical direction does not indicate a positional relationship or a direction when the motor has been assembled into an actual apparatus. Further, a direction parallel or substantially parallel to the central axis is referred to as an "axial direction", a radial direction centered on the central axis is simply referred to as a "radial direction", and a circumferential direction centered on the central axis is simply referred to as a "circumferential direction".

FIG. 1 is a cross-sectional view of a hard disk drive apparatus (hereinafter simply referred to as a "disk drive apparatus") 1A which includes a spindle motor (hereinafter simply referred to as a "motor") 12A according to an exemplary preferred embodiment of the present invention. The disk drive apparatus 1A is a so-called hard disk drive apparatus. The disk drive apparatus 1A preferably includes a disk 11A, the motor 12A, an access portion 13A, and a housing 14A. The motor 12A rotates the disk 11A, on which information is recorded. The access portion 13A performs at least one of reading and writing of information from or to the disk 11A.

The housing 14A preferably includes a base member 141A and a plate-shaped cover member 142A. The disk 11A, the motor 12A, and the access portion 13A are accommodated inside the base member 141A. The base member 141A preferably includes a fixing portion 143A arranged to fix the cover member 142A. In the disk drive apparatus 1A according to this preferred embodiment, the fixing portion 143A is defined by a fastener such as, for example, a screw. That is, the cover member 142A is preferably fixed to the base member 141A by a screw. However, the fixing portion 143A is not limited to a screw and may also be provided by welding, caulking, etc. The cover member 142A is fitted to the base member 141A, such that the housing 14A is defined.

The disk 11A is fixed to the motor 12A by a clamper 151A. The access portion 13A preferably includes a head 131A, an arm 132A, and a head moving mechanism 133A. The head 131A approaches the disk 11A, thereby magnetically performing at least one of reading and writing of information. The arm 132A supports the head 131A. The head moving mechanism 133A moves the arm 132A, thereby moving the head 131A relatively with respect to the disk 11A. By these configurations, the head 131A makes access to a desired position of the disk 11A in a state where it is in close proximity to the disk 11A, which rotates.

Figure 2:
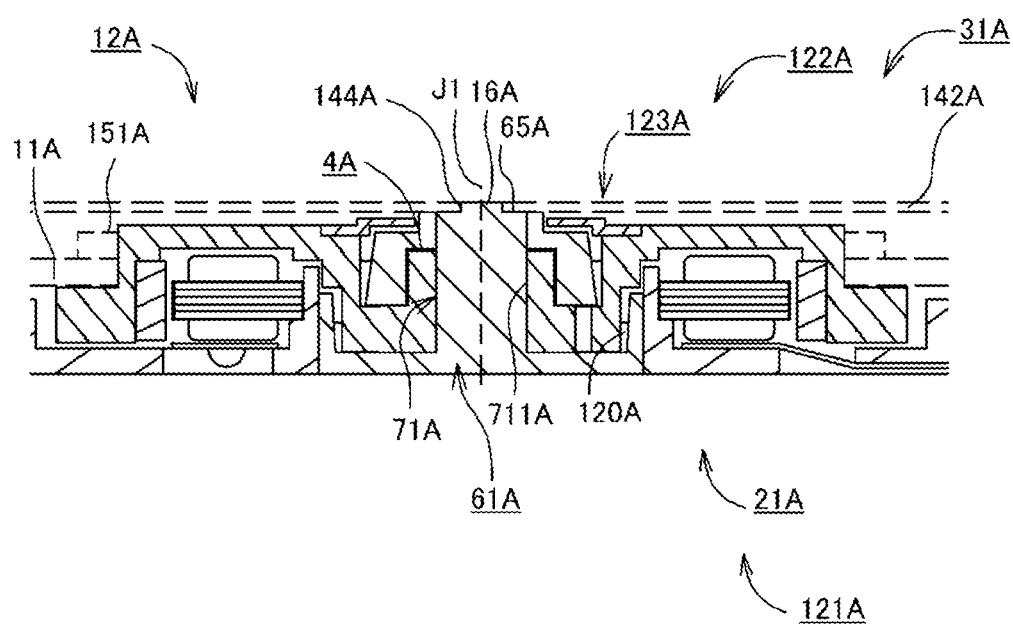
FIG. 2 is a cross-sectional view of the spindle motor according to an exemplary preferred embodiment of the present invention.

FIG. 2 is a cross-sectional view of the motor 12A. In FIG. 2, the cover member 142A, the clamper 151A, and the disk 11A are shown by a dotted line. The motor 12A preferably includes a stationary portion 121A, a rotating portion 122A, and a bearing mechanism 123A. The rotating portion 122A is preferably rotatably supported through the intermediary of lubricating oil 120A with respect to the stationary portion 121A around a central axis J1 of the motor 12A.

The stationary portion 121A preferably includes a stationary shaft 61A and a base plate 21A. The base plate 21A is included in the base member 141A. That is, the base plate 21A is a portion of the base member 141A. The stationary shaft 61A is disposed along the central axis J1. The stationary shaft 61A is fixed to the base plate 21A. That is, the stationary shaft 61A is fixed to the base member 141A. The stationary shaft 61A also defines a portion of the bearing mechanism 123A.

The rotating portion 122A preferably includes a rotor hub 31A that is a hub portion. In addition, the rotor hub 31A includes a sleeve portion 4A. Further, the sleeve portion 4A also defines a portion of the bearing mechanism 123A. The sleeve portion 4A preferably includes an inner circumferential surface which defines a bearing hole penetrating in the axial direction. The stationary shaft 61A is inserted into the bearing hole of the sleeve portion 4A.

A gap (hereinafter referred to as a "radial gap") 71A is defined between the outer circumferential surface of the stationary shaft 61A and the inner circumferential surface of the sleeve portion 4A. The radial gap 71A is filled with the lubricating oil 120A. In this preferred embodiment, a dynamic pressure generating groove array (hereinafter referred to as a "radial dynamic pressure generating groove array") 711A is provided in the inner circumferential surface of the sleeve portion 4A. However, the radial dynamic pressure generating groove array 711A may also be provided in the outer circumferential surface of the stationary shaft 61A and may also be provided in both the outer circumferential surface of the stationary shaft 61A and the inner circumferential surface of the sleeve portion 4A if so desired. That is, the radial dynamic pressure generating groove array 711A is preferably provided in at least one of the outer circumferential surface of the stationary shaft 61A and the inner circumferential surface of the sleeve portion 4A which define the radial gap 71A. In the radial gap 71A, fluid dynamic pressure is generated on the lubricating oil 120A in the radial direction due to the radial dynamic pressure generating groove array 711A.

The stationary shaft 61A preferably includes an annular surface 65A and an upper protrusion 16A. The annular surface 65A is located higher than the sleeve portion 4A. The annular surface 65A is a surface arranged to come into contact with the cover member and extends in the circumferential direction. In the disk drive apparatus 1A, the annular surface 65A comes into contact with the cover member 142A.

The upper protrusion 16A protrudes upward from the radial inner side of the annular surface 65A. The upper protrusion 16A is a portion arranged to be fixed to a cover inner circumferential surface defining a cover penetrating hole of the cover member. In the disk drive apparatus 1A, the upper protrusion 16A is fitted into a cover penetrating hole 144A of the cover member 142A.

In the motor 12A according to the preferred embodiment described above, the annular surface 65A arranged to come into contact with the cover member and the upper protrusion 16A arranged to fix the cover member are preferably included. For this reason, in the disk drive apparatus 1A, the cover member 142A can be fixed to the upper protrusion 16A while being supported by the annular surface 65A. That is, the cover member 142A can be accurately fixed to the stationary shaft 61A.

As a result, a screw arranged to fix the stationary shaft 61A to the cover member 142A becomes unnecessary. Therefore, according to the motor 12A of the present preferred embodiment, a reduction in thickness can be achieved in addition to securing the axial length of the radial gap 71A of the motor 12A. Accordingly, in the disk drive apparatus 1A, higher capacity and a reduction in thickness can be achieved.

Subsequently, a more specific preferred embodiment of the present invention will be described.

Figure 3:
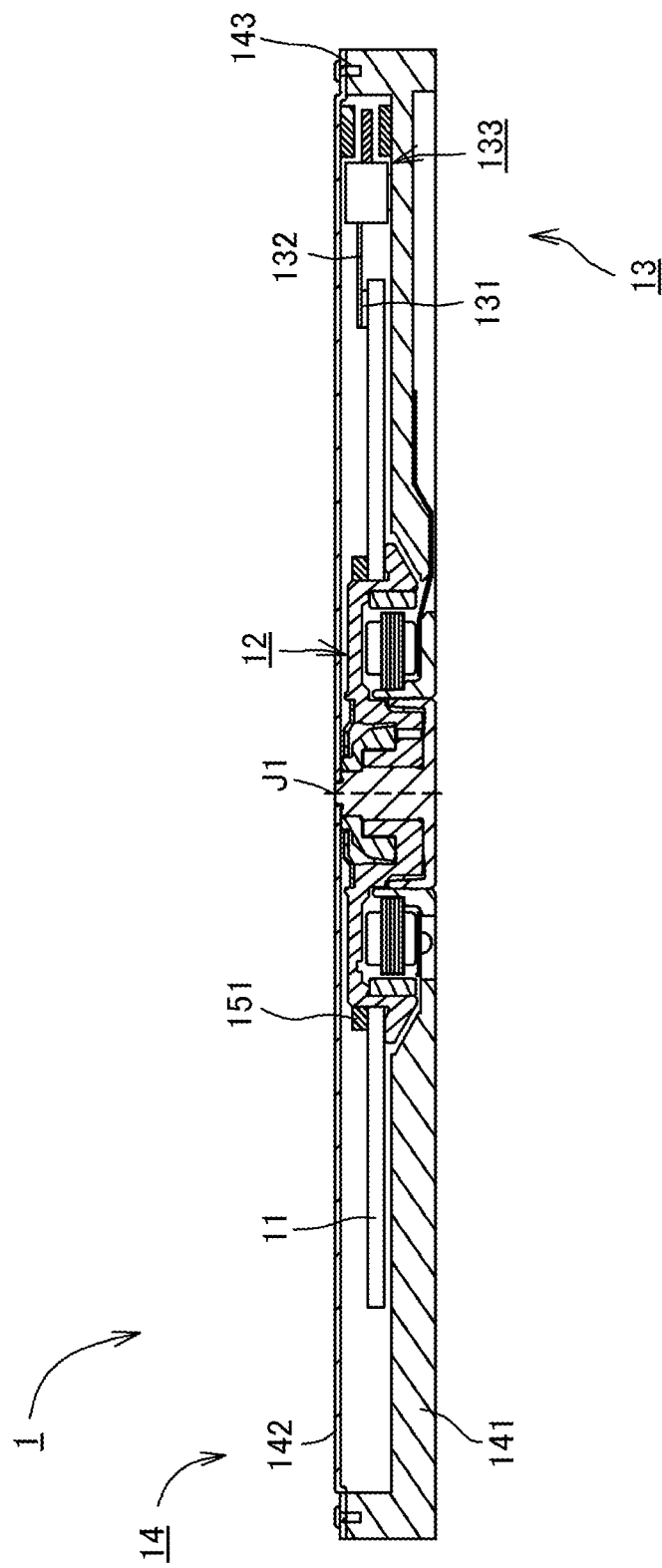
FIG. 3 is a cross-sectional view of a disk drive apparatus which includes a spindle motor according to a more specific preferred embodiment of the present invention.

FIG. 3 is a cross-sectional view of a disk drive apparatus 1 which includes a motor 12 according to a more specific preferred embodiment of the present invention. The disk drive apparatus 1 preferably includes a disk 11, the motor 12, an access portion 13, and a housing 14. The motor 12 rotates the disk 11, on which information is recorded. The access portion 13 performs at least one of reading and writing of information from or to the disk 11.

The housing 14 preferably includes a base member 141 and a plate-shaped cover member 142. The disk 11, the motor 12, and the access portion 13 are accommodated inside the base member 141. The base member 141 preferably includes a fixing portion 143 arranged to fix the cover member. In the disk drive apparatus 1 according to this preferred embodiment, the fixing portion 143 is preferably defined by a screw. That is, the cover member 142 is fixed to the base member 141 by a screw, for example. The cover member 142 is fitted to the base member 141 such that the housing 14 is defined. An internal space of the housing 14 of the disk drive apparatus 1 is preferably a clean space having no, or only an extremely low presence of, dust and/or dirt. In this preferred embodiment, air is present in the disk drive apparatus 1. In addition, the inside of the disk drive apparatus 1 may be filled with, for example, helium gas or hydrogen gas and may also be filled with a mixed gas produced by these gases and air.

The disk 11 is preferably fixed to the motor 12 by a clamper 151. The access portion 13 preferably includes a head 131, an arm 132, and a head moving mechanism 133. The head 131 approaches the disk 11, thereby magnetically performing at least one of reading and writing of information. The arm 132 supports the head 131. The head moving mechanism 133 moves the arm 132, thereby moving the head 131 relatively with respect to the disk 11. By these configurations, the head 131 accesses a desired position of the disk 11 in a state where it is in close proximity to the disk 11 which rotates.

Figure 4:
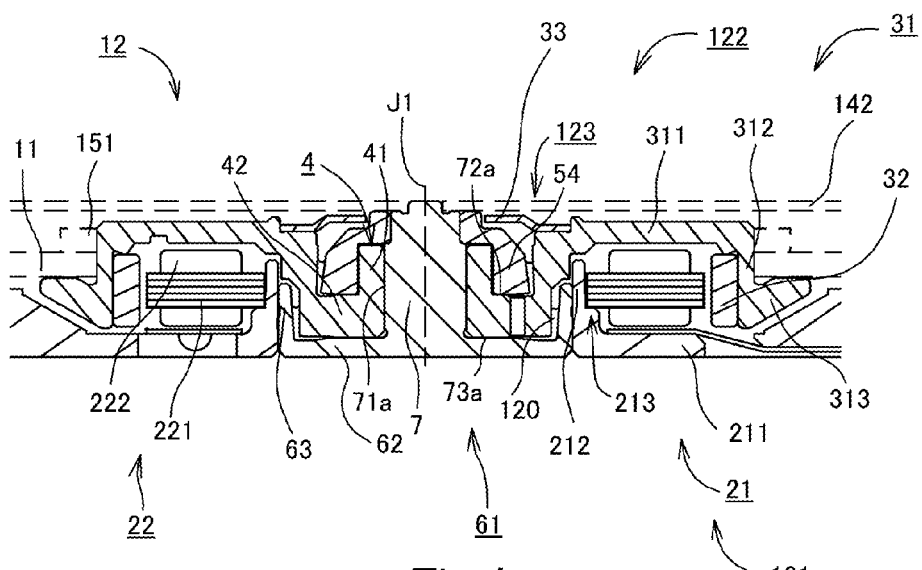
FIG. 4 is a cross-sectional view of the spindle motor according to the more specific preferred embodiment of the present invention.

FIG. 4 is a cross-sectional view of the motor 12. In FIG. 4, the cover member 142, the clamper 151, and the disk 11 are shown by a dotted line. The motor 12 is an outer rotor type motor. The motor 12 includes a stationary portion 121 that is a fixed assembly, a rotating portion 122 that is a rotating assembly, and a bearing mechanism 123. The rotating portion 122 is rotatably supported through the intermediary of lubricating oil 120 with respect to the stationary portion 121 around a central axis J1 of the motor 12.

The stationary portion 121 preferably includes a stationary shaft 61, a base plate 21, and a stator 22. The base plate 21 is included in the base member 141. That is, the base plate 21 is a portion of the base member 141. The base plate 21 is a member preferably made of, for example, die cast aluminum. The stationary shaft 61 is disposed along the central axis J1. The stationary shaft 61 is fixed to the base plate 21. That is, the stationary shaft 61 is fixed to the base member 141. The stationary shaft 61 also defines a portion of the bearing mechanism 123.

The base plate 21 includes a bottom portion 211, a stator fixing portion 212, and a step portion 213. The stator fixing portion 212 preferably has a cylindrical or substantially cylindrical shape and faces upward from an inner edge portion of the bottom portion 211. The step portion 213 protrudes outward in the radial direction from a lower portion of the stator fixing portion 212 between the stator fixing portion 212 and the bottom portion 211. The bearing mechanism 123 is disposed inside the stator fixing portion 212.

The stator 22 includes a stator core 221 and a coil 222. A conducting wire is wound on the stator core 221, whereby the coil 222 is defined. An inner portion of the stator core 221 in the radial direction is fixed to the outer circumferential surface of the stator fixing portion 212. Further, the lower surface of the portion axially comes into contact with the upper surface of the step portion 213. The stator 22 is preferably fixed to the stator fixing portion 212 by, for example, an adhesive in a state where a clearance is interposed between the stator 22 and the outer circumferential surface of the stator fixing portion 212.

The rotating portion 122 preferably includes a rotor hub 31 that is a hub portion, a rotor magnet 32, and a seal cap 33. The rotor hub 31 preferably is defined by a single monolithic member. The rotor hub 31 is preferably formed by, for example, shaping a slug into an appropriate shape through forging process and then shaping it into a final shape through cutting work. The rotor hub 31 preferably includes a sleeve portion 4, a cover portion 311, a hub cylindrical portion 312, and a disk placing portion 313. The seal cap 33 is disposed above the sleeve portion 4. The sleeve portion 4 also defines a portion of the bearing mechanism 123. The cover portion 311 extends outward in the radial direction from the sleeve portion 4. The hub cylindrical portion 312 extends downward from an outer edge portion of the cover portion 311. The rotor magnet 32 is fixed to the inside of the hub cylindrical portion 312. The disk placing portion 313 protrudes outward in the radial direction from the outer circumferential surface of the hub cylindrical portion 312 and the disk 11 in FIG. 3 is disposed on the disk placing portion 313. The disk 11 is supported by the clamper 151 and the rotor hub 31. The rotor magnet 32 faces the stator 22 in the radial direction. Torque is generated between the stator 22 and the rotor magnet 32.

Figure 5:
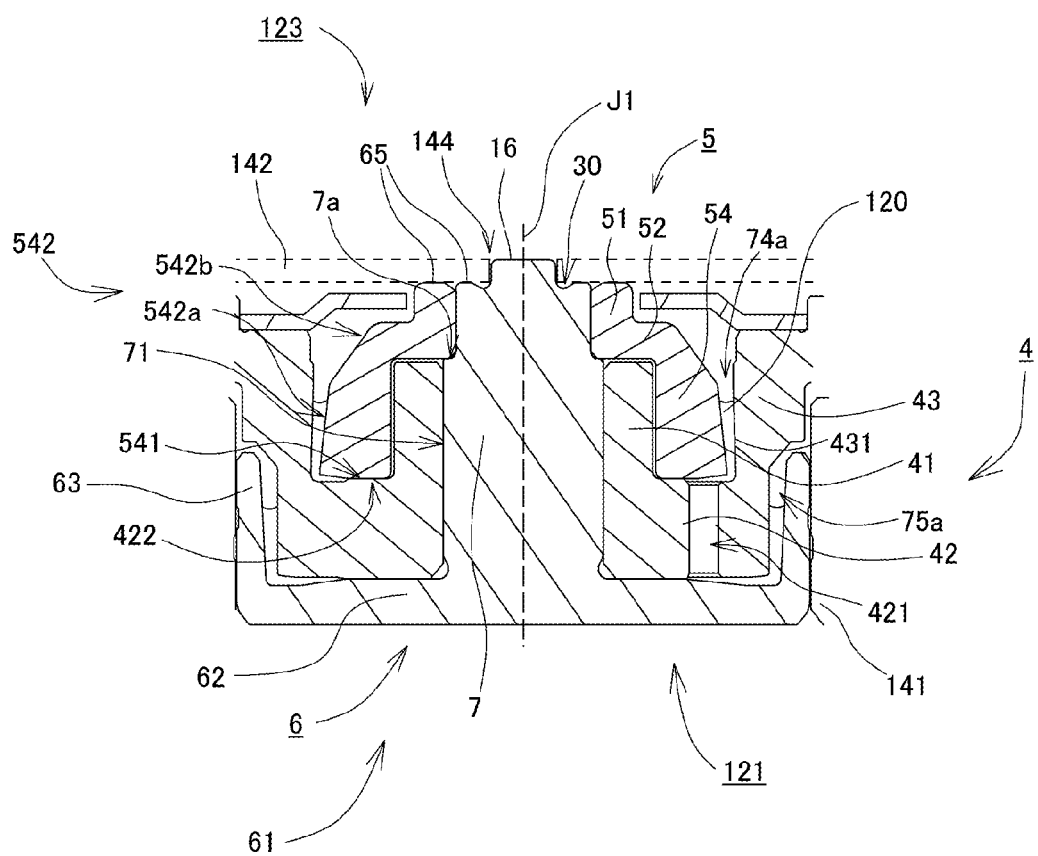
FIG. 5 is a cross-sectional view of a bearing mechanism according to a preferred embodiment of the present invention.

FIG. 5 is an enlarged cross-sectional view showing the bearing mechanism 123. The bearing mechanism 123 preferably includes the sleeve portion 4, a portion of an upper cup portion 5, a portion of a lower cup portion 6, and the lubricating oil 120. The upper cup portion 5 and the lower cup portion 6 also define portions of the stationary portion 121. Specifically, the upper cup portion 5 and the lower cup portion 6 also define portions of the stationary shaft 61. The sleeve portion 4 is preferably located between the upper cup portion 5 and the lower cup portion 6. The sleeve portion 4 preferably includes an inner sleeve cylindrical portion 41, a sleeve flange portion 42, and an outer sleeve cylindrical portion 43. The inner sleeve cylindrical portion 41 preferably has a cylindrical or substantially cylindrical shape centered on the central axis J1. The inner sleeve cylindrical portion 41 of the sleeve portion 4 includes an inner circumferential surface which defines a bearing hole penetrating in the axial direction. The stationary shaft 61 is inserted into the sleeve portion 4. The sleeve flange portion 42 extends outward in the radial direction from a lower end portion of the inner sleeve cylindrical portion 41. The sleeve flange portion 42 preferably includes a communicating hole 421 which penetrates the sleeve flange portion 42 in the vertical direction. In this preferred embodiment, the number of communicating holes 421 is preferably one, for example. The communicating hole 421 is arranged in the sleeve flange portion such that it is possible to shorten the communicating hole 421, and thus it is possible to reduce flow path resistance in the communicating hole 421. Further, it is possible to reduce the amount of lubricating oil 120 in the communicating hole 421 and prevent variation in the interface of the lubricating oil 120 in an upper seal portion 74a and a lower seal portion 75a due to the influence of the force of gravity. Since in this preferred embodiment, the number of communicating holes 421 is preferably one, there is a concern that an imbalance in the circumferential direction may occur in the rotating portion 122. However, in this preferred embodiment, since it is possible to shorten the communicating hole 421, imbalance in the circumferential direction of the rotating portion 122 can be prevented.

The outer sleeve cylindrical portion 43 extends upward from an outer edge portion of the sleeve flange portion 42. Hereinafter, a portion that is a lower portion of the inner sleeve cylindrical portion 41 and is also an inner peripheral portion of the sleeve flange portion 42 will be described as a portion of the inner sleeve cylindrical portion 41. Further, a portion that is a lower portion of the outer sleeve cylindrical portion 43 and is also an outer peripheral portion of the sleeve flange portion 42 will be described as a portion of the outer sleeve cylindrical portion 43. In the sleeve portion 4, the radial width between the outer circumferential surface of the inner sleeve cylindrical portion 41 and an inner circumferential surface 431 of the outer sleeve cylindrical portion 43 is wider than the radial width of the inner sleeve cylindrical portion 41.

The stationary shaft 61 preferably includes a shaft portion 7, the upper cup portion 5, and the lower cup portion 6. The shaft portion 7 is a substantially columnar portion which is disposed along the central axis J1. The shaft portion 7 of the stationary shaft 61 is inserted into the sleeve portion 4. In this preferred embodiment, the upper cup portion 5 and the shaft portion 7 are preferably defined by separate members. The upper cup portion 5 extends outward in the radial direction from an upper portion of the shaft portion 7. The lower cup portion 6 extends outward in the radial direction from a lower end portion of the shaft portion 7.

The stationary shaft 61 preferably further includes an annular surface 65 and an upper protrusion 16. The annular surface 65 is located higher than the sleeve portion 4. The annular surface 65 is a surface arranged to come into contact with the cover member and extends in the circumferential direction. In this preferred embodiment, the annular surface 65 is defined by the upper surface of the shaft portion 7 and the upper end surface of the upper cup portion 5. Specifically, the annular surface 65 is defined by the upper surface of the shaft portion 7 and the upper surface of an inner upper cylindrical portion 51 which will be described later. The upper protrusion 16 protrudes upward from the radial inner side of the annular surface 65. That is, the upper protrusion 16 is a portion protruding upward from the upper surface of the shaft portion 7. Preferably, the upper protrusion 16 is disposed on the central axis J1. The upper protrusion 16 is a portion arranged to be fixed to a cover inner circumferential surface defining a cover penetrating hole of the cover member. In the disk drive apparatus 1, the upper protrusion 16 is fitted into a cover penetrating hole 144 of the cover member 142. That is, in this preferred embodiment, the stationary shaft 61 is preferably fixed to the cover member 142 by an adhesive. More specifically, the upper protrusion 16 faces the cover inner circumferential surface with a clearance interposed therebetween. Then, an ultraviolet curing adhesive is preferably provided between the upper protrusion 16 and the cover inner circumferential surface.

In the motor 12, the annular surface 65 arranged to come into contact with the cover member 142 and the upper protrusion 16 arranged to fix the cover member 142 are included. For this reason, in the disk drive apparatus 1, the cover member 142 can be fixed to the upper protrusion 16 while being supported by the annular surface 65. That is, the cover member 142 can be accurately fixed to the stationary shaft 61. As a result, a screw arranged to fix the stationary shaft 61 to the cover member 142 becomes unnecessary. Therefore, according to the motor 12 of this preferred embodiment, a reduction in thickness can be achieved in addition to securing the axial length of a radial gap 71 of the motor 12. Accordingly, in the disk drive apparatus 1, higher capacity and a reduction in thickness can be achieved. In addition, the details of the radial gap 71 will be described later.

In the motor 12, a groove portion 30 recessed in an annular pattern is preferably provided between an inner end portion of the upper surface of the shaft portion 7 and a lower end portion of the outer circumferential surface of the upper protrusion 16, that is, between the annular surface 65 and the upper protrusion 16. Since the groove portion 30 is provided, in a case where burrs are produced in the vicinity of a lower end portion of the inner circumferential surface defining the cover penetrating hole of the cover member, the burrs can be accommodated in the groove portion 30. Therefore, in the disk drive apparatus 1, the cover member 142 can be accurately supported. Further, in a case where the cover member 142 is bonded and fixed to the upper protrusion 16, the groove portion 30 functions as an adhesive retaining portion. As a result, in the disk drive apparatus 1, it is possible to solidly fix the cover member 142. Further, the passage of gas between the inside and the outside of the disk drive apparatus 1 is significantly reduced and prevented by the adhesive retaining portion.

The upper cup portion 5 preferably includes the inner upper cylindrical portion 51, an upper flange portion 52, and an outer upper cylindrical portion 54. The inner upper cylindrical portion 51, the upper flange portion 52, and the outer upper cylindrical portion 54 are preferably defined by a single monolithic member made through, for example, a cutting work. In addition, the upper cup portion 5 may also be shaped through, for example, a forging process, press working, etc. The inner upper cylindrical portion 51 preferably has a cylindrical or substantially cylindrical shape centered on the central axis J1. The upper flange portion 52 extends outward in the radial direction from a lower end portion of the inner upper cylindrical portion 51. The outer upper cylindrical portion 54 extends downward from an outer edge portion of the upper flange portion 52. That is, the outer upper cylindrical portion 54 is of a cylindrical or substantially cylindrical shape centered on the central axis J1. Hereinafter, a portion that is a lower portion of the inner upper cylindrical portion 51 and is also an inner peripheral portion of the upper flange portion 52 will be described as a portion of the inner upper cylindrical portion 51. Further, a portion that is an upper portion of the outer upper cylindrical portion 54 and is also an outer peripheral portion of the upper flange portion 52 will be described as a portion of the outer upper cylindrical portion 54. The outer upper cylindrical portion 54 is located outside the inner sleeve cylindrical portion 41 and inside the outer sleeve cylindrical portion 43. A lower surface 541 of the outer upper cylindrical portion 54 axially faces an upper surface 422 of the sleeve flange portion 42. An outer circumferential surface 542 of the outer upper cylindrical portion 54 is preferably inclined inward in the radial direction as it extends axially upwards.

The outer circumferential surface 542 of the outer upper cylindrical portion 54 preferably includes a first inclined surface 542a and a second inclined surface 542b. The second inclined surface 542b is located above the first inclined surface 542a. The first inclined surface 542a is continuous with the second inclined surface 542b. The second inclined surface

542*b* is preferably further inclined toward the central axis J1 than the first inclined surface 542*a*.

The lower cup portion 6 preferably includes a lower plate portion 62 and a lower cylindrical portion 63. The lower plate portion 62 and the lower cylindrical portion 63 are preferably defined by a single monolithic member made, for example, through a cutting work. In this preferred embodiment, the upper protrusion 16, the shaft portion 7, the lower plate portion 62, and the lower cylindrical portion 63 are preferably defined by a single monolithic member. The lower plate portion extends outward in the radial direction from a lower end portion of the shaft portion 7. In the motor 12, the sleeve portion 4 is disposed between the lower plate portion 62 and the upper flange portion 52. The shaft portion 7 is inserted into a bearing hole of the inner sleeve cylindrical portion 41. A shaft step portion 7*a* is preferably provided at an upper portion of the shaft portion 7. The shaft step portion 7*a* includes a step surface that is of an annular shape extending in the circumferential direction and faces upward. The lower surface of the inner upper cylindrical portion 51 comes into contact with the step surface. The inner upper cylindrical portion 51 is fixed to the outer circumferential surface of the upper portion of the shaft portion 7. In this preferred embodiment, the inner upper cylindrical portion 51 of the upper cup portion 5 is preferably bonded and fixed to the upper portion of the shaft portion 7. Since the upper cup portion 5 is bonded and fixed to the shaft portion 7, deformation of the upper cup portion 5, that is, deformation of the annular surface 65 in the inner upper cylindrical portion 51 can be prevented or substantially prevented.

In this preferred embodiment, the inner upper cylindrical portion 51 of the upper cup portion 5 is bonded and fixed to the upper portion of the shaft portion 7. However, the fixing may also be performed by a different method. In a case where the inner upper cylindrical portion 51 is press-fitted to the upper portion of the shaft portion 7, even if an impact from the outside is applied to the inner upper cylindrical portion 51 through the cover member 142 in the disk drive apparatus 1, since the inner upper cylindrical portion 51 is solidly fixed to the shaft portion 7, position shift of the inner upper cylindrical portion 51 with respect to the shaft portion 7 can be prevented or significantly reduced.

Further, in this preferred embodiment, a lower end of the stationary shaft 61 is directly fixed to the base member 141. However, the stationary shaft 61 may also be indirectly fixed to the base member 141 through another member, if so desired.

The lower cylindrical portion 63 extends upward at an outer edge of the lower plate portion 62. The lower cylindrical portion 63 is located outside the outer sleeve cylindrical portion 43 in the radial direction. Further, as shown in FIG. 4, the lower cylindrical portion 63 is located inside the stator fixing portion 212 in the radial direction. The outer circumferential surface of the lower cylindrical portion 63 is preferably fixed to the inner circumferential surface of the stator fixing portion 212 having a cylindrical or substantially cylindrical shape. The lower plate portion 62 extends inward in the radial direction from a lower portion of the lower cylindrical portion 63 and connects the lower cylindrical portion 63 and a lower portion of the shaft portion 7 at the lower side of the sleeve flange portion 42. An upper end of the lower cylindrical portion 63 is located lower than the lower surface 541 of the outer upper cylindrical portion 54 in the axial direction.

Figure 6:
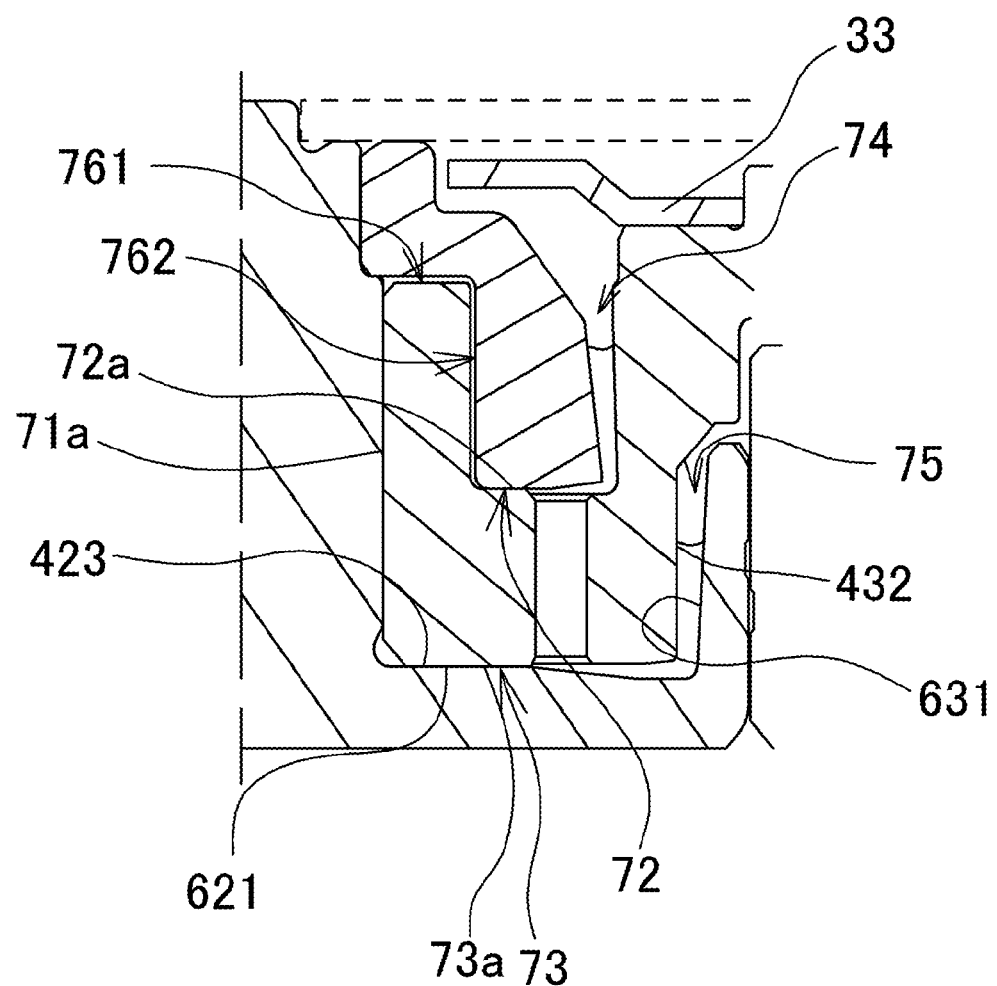
FIG. 6 is an enlarged cross-sectional view showing the bearing mechanism and the vicinity of a stationary shaft according to a preferred embodiment of the present invention.

FIG. 6 is an enlarged cross-sectional view showing the bearing mechanism 123 and the vicinity of the stationary shaft 61. In addition, in FIG. 6, reference numerals same as those in FIG. 5 are omitted. The inner upper cylindrical portion 51 and the upper flange portion 52 are located above the inner sleeve cylindrical portion 41. The inner upper cylindrical portion 51 includes the annular surface 65 arranged to come into contact with the cover member. The upper end surface of the inner upper cylindrical portion 51 defines a portion of the annular surface 65. In the disk drive apparatus 1, the annular surface 65 defined by the upper surface of the shaft portion 7 and the upper end surface of the inner upper cylindrical portion 51 comes into contact with the cover member 142. The annular surface 65 is preferably a worked surface formed through, for example, a cutting work.

A gap 761 extending in the radial direction is defined between the upper surface of the inner sleeve cylindrical portion 41 and the lower surfaces of the upper flange portion 52 and the inner upper cylindrical portion 51. A cylindrical gap 762 centered on the central axis J1 is defined between the outer circumferential surface of the inner sleeve cylindrical portion and the inner circumferential surface of the outer upper cylindrical portion 54. The radial gap 71 is defined between the outer circumferential surface of the shaft portion 7 of the stationary shaft 61 and the inner circumferential surface of the inner sleeve cylindrical portion 41 of the sleeve portion 4.

Further, a gap 72 is defined between the upper surface 422 of the sleeve flange portion 42 and the lower surface 541 of the outer upper cylindrical portion 54. More specifically, in this preferred embodiment, the gap 72 is defined between an area radially inner than the communicating hole 421 of the upper surface 422 of the sleeve flange portion 42 and the lower surface 541 of the outer upper cylindrical portion 54. The gap 72 will be hereinafter referred to as an "upper thrust gap 72". The upper thrust gap 72 is connected to an upper portion of the radial gap 71 through the gap 762 between the outer circumferential surface of the inner sleeve cylindrical portion 41 shown in FIG. 5 and the inner circumferential surface of the outer upper cylindrical portion 54 and the gap 761 between the upper surface of the inner sleeve cylindrical portion 41 and the lower surfaces of the upper flange portion 52 and the inner upper cylindrical portion 51. The gap 761 will be hereinafter referred to as a "lateral connection gap 761". The gap 762 will be referred to as a "vertical connection gap 762".

A gap 73 is defined between a lower surface 423 of the sleeve flange portion 42 and an upper surface 621 of the lower plate portion 62. More specifically, in this preferred embodiment, the gap 73 is defined between an area radially inner than the communicating hole 421 of the lower surface 423 of the sleeve flange portion 42 and the upper surface 621 of the lower plate portion 62. The gap 73 will be hereinafter referred to as a "lower thrust gap 73". The upper thrust gap 72 and the lower thrust gap 73 communicate with each other by the communicating hole 421.

A gap 74, which is opened upward, is defined between the outer circumferential surface 542 of the outer upper cylindrical portion 54 and the inner circumferential surface 431 of the outer sleeve cylindrical portion 43. The gap 74 will be hereinafter referred to as an "upper seal gap 74". The radial width of the upper seal gap 74 gradually increases in an upward direction.

In the upper seal gap 74, the upper seal portion 74*a* which retains the lubricating oil 120 by capillary action is provided. Specifically, the upper seal portion 74*a* is defined by the inner circumferential surface 431 of the outer sleeve cylindrical portion 43 and the first inclined surface 542*a*. The interface of the lubricating oil 120 is located in the upper seal portion 74*a*. The upper seal portion 74*a* is located outside the radial gap 71 in the radial direction. An opening of the upper seal gap 74 is preferably covered by the seal cap 33. The opening of the upper seal gap 74 is defined by the inner circumferential surface 431 of the outer sleeve cylindrical portion 43 and the second inclined surface 542b.

An inner circumferential surface 631 of the lower cylindrical portion 63 is inclined outward in the radial direction as it heads upward. A gap 75, which is opened upward, is defined between the inner circumferential surface 631 of the lower cylindrical portion 63 and an outer circumferential surface 432 of a lower portion of the outer sleeve cylindrical portion 43. The gap 75 will be hereinafter referred to as a "lower seal gap 75". The radial width of the lower seal gap 75 gradually increases in an upward direction. In the lower seal gap 75, the lower seal portion 75a which retains the lubricating oil 120 by capillary action is defined. The interface of the lubricating oil 120 is located in the lower seal portion 75a. The lower seal portion 75a is located outside the upper seal portion 74a and the radial gap 71 in FIG. 6 in the radial direction. In the bearing mechanism 123 according to this preferred embodiment, the lower seal gap 75 is located outside the upper seal gap 74 in the radial direction and the lower surface 541 of the outer upper cylindrical portion 54 is located lower than the upper end of the lower cylindrical portion 63 in the axial direction. In this way, it is possible to lengthen the axial lengths of the upper seal gap 74 and the lower seal gap 75, and thus it is preferably possible to sufficiently secure an oil buffer of the lubricating oil 120 in the upper seal gap 74 and the lower seal gap 75. As a result, the longer service life of the motor 12 can be achieved.

The lower seal portion 75a is connected to the upper seal portion 74a through the communicating hole 421. In this way, it is possible to reduce generation of a pressure difference between the upper and lower seal portions 74a and 75a.

A possible existing range in the axial direction of the upper seal portion 74a, that is, a range in the axial direction from the position on the lower side of the upper seal gap 74 to the upper limit of a position where the interface of the lubricating oil 120 can be provided, overlaps with an existing range in the axial direction of the radial gap 71 in the radial direction over the entire length. In addition, an upper end of the possible existing range of the upper seal portion 74a may also conform to the interface of the lubricating oil 120 in the axial direction. Similarly, a possible existing range in the axial direction of the lower seal portion 75a, that is, a range in the axial direction from the position on the lower side of the lower seal gap 75 to the upper limit of a position where the interface of the lubricating oil 120 can be provided, overlaps with the existing range of the radial gap 71 in the radial direction over almost the entire length.

In the bearing mechanism 123, the upper seal gap 74, the upper thrust gap 72, the vertical connection gap 762, the lateral connection gap 761, the radial gap 71, the lower thrust gap 73, the lower seal gap 75, and the communicating hole 421 are preferably continuously filled with the lubricating oil 120.

Figure 7:
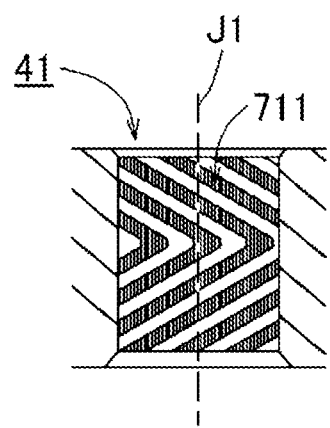
FIG. 7 is a cross-sectional view of an inner sleeve cylindrical portion according to a preferred embodiment of the present invention.

FIG. 7 is a cross-sectional view of the inner sleeve cylindrical portion 41. In FIG. 7, the shape of the inner sleeve cylindrical portion 41 is also shown. A radial dynamic pressure generating groove array 711 is preferably defined in the inner circumferential surface of the inner sleeve cylindrical portion 41 of the sleeve portion 4. In FIG. 7, dynamic pressure grooves are cross-hatched. Hereinafter, also in other drawings, the dynamic pressure grooves are cross-hatched. The radial dynamic pressure generating groove array 711 is preferably an aggregate of herringbone-shaped grooves, that is, a plurality of substantially V-shaped grooves arranged sideways along the circumferential direction of the inner circumferential surface.

In the radial gap 71 shown in FIG. 6, a radial dynamic pressure bearing portion 71a which generates fluid dynamic pressure on the lubricating oil 120 in the radial direction is defined by the radial dynamic pressure generating groove array 711.

Figure 8:
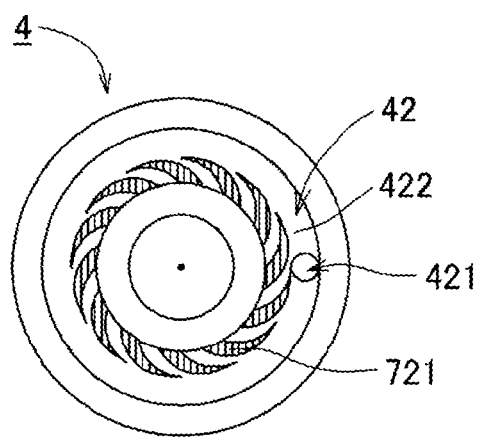
FIG. 8 is a plan view of a sleeve portion according to a preferred embodiment of the present invention.

FIG. 8 is a plan view of the sleeve portion 4. In the upper surface 422 of the sleeve flange portion 42, an upper thrust dynamic pressure generating groove array 721 with a spiral shape is preferably provided. The upper thrust dynamic pressure generating groove array 721 is preferably arranged more radially inward than an opening on the upper side of the communicating hole 421. However, a portion of the upper thrust dynamic pressure generating groove array 721 may also overlap with the opening of the communicating hole 421, if so desired. In the upper thrust gap 72 shown in FIG. 6, an upper thrust dynamic pressure bearing portion 72a which generates fluid dynamic pressure on the lubricating oil 120 in the axial direction is defined by the upper thrust dynamic pressure generating groove array 721.

Figure 9:
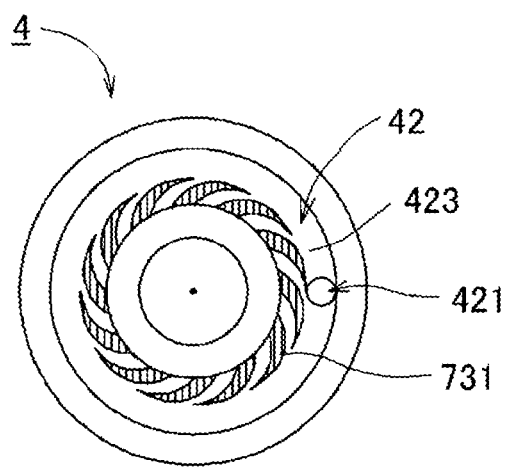
FIG. 9 is a bottom view of the sleeve portion according to a preferred embodiment of the present invention.

FIG. 9 is a bottom view of the sleeve portion 4. In the lower surface 423 of the sleeve flange portion 42, a lower thrust dynamic pressure generating groove array 731 with a spiral shape is preferably provided. The lower thrust dynamic pressure generating groove array 731 is preferably arranged more radially inward than an opening on the lower side of the communicating hole 421. However, a portion of the lower thrust dynamic pressure generating groove array 731 may also overlap with the opening of the communicating hole 421, if so desired. In the lower thrust gap 73 shown in FIG. 6, a lower thrust dynamic pressure bearing portion 73a which generates fluid dynamic pressure on the lubricating oil 120 in the axial direction is preferably defined by the lower thrust dynamic pressure generating groove array 731.

When the motor 12 shown in FIG. 4 is driven, the inner sleeve cylindrical portion 41 is supported in the radial direction with respect to the shaft portion 7 by the radial dynamic pressure bearing portion 71a. Further, the sleeve flange portion 42 is supported in the axial direction with respect to the outer upper cylindrical portion 54 and the lower plate portion 62 by a thrust dynamic pressure bearing which is defined by the upper thrust dynamic pressure bearing portion 72a and the lower thrust dynamic pressure bearing portion 73a. The upper thrust dynamic pressure bearing portion 72a and the lower thrust dynamic pressure bearing portion 73a are provided on the upper and lower sides of the sleeve flange portion 42, whereby the sleeve portion 4 can be supported in the axial direction at a position separated from the central axis J1. As a result, the rigidity of the bearing mechanism 123 can be improved.

As described above, in the motor 12 according to this preferred embodiment, since the annular surface 65 arranged to come into contact with the cover member and the upper protrusion arranged to fix the cover member are included, the cover member 142 can be accurately fixed to the stationary shaft 61. As a result, a screw arranged to fix the stationary shaft 61 to the cover member 142 becomes unnecessary. Therefore, according to the motor 12 of this preferred embodiment, a reduction in thickness can be achieved in addition to securing the axial length of the radial gap 71 of the motor 12.

Further, in the motor 12, since the inner upper cylindrical portion 51 of the upper cup portion 5 is bonded and fixed to the upper portion of the shaft portion 7, deformation of the upper cup portion 5, that is, deformation of the annular surface 65 in the inner upper cylindrical portion 51 can be prevented. Therefore, in the disk drive apparatus 1, the cover member 142 can be accurately supported. In addition, it is possible to accurately provide the upper thrust gap 72 which is defined between the upper surface 422 of the sleeve flange portion 42 and the lower surface 541 of the outer upper cylindrical portion 54.

In the motor 12, since the groove portion 30 is provided, in a case where burrs exist in the vicinity of the lower end portion of the inner circumferential surface defining the cover penetrating hole of the cover member, the burrs can be accommodated in the groove portion 30. Therefore, in the disk drive apparatus 1, the cover member 142 can be accurately supported. Further, in a case where the cover member 142 is bonded and fixed to the upper protrusion 16, the groove portion 30 functions as an adhesive retaining portion. As a result, in the disk drive apparatus 1, it is possible to solidly fix the cover member 142.

In addition, in the disk drive apparatus 1, since the motor 12 includes the annular surface 65 and the upper protrusion 16, a higher capacity and a reduction in thickness can be achieved.

The exemplary preferred embodiments of the present invention have been described above. However, the present invention is not limited to the preferred embodiments described above.

Figure 10:
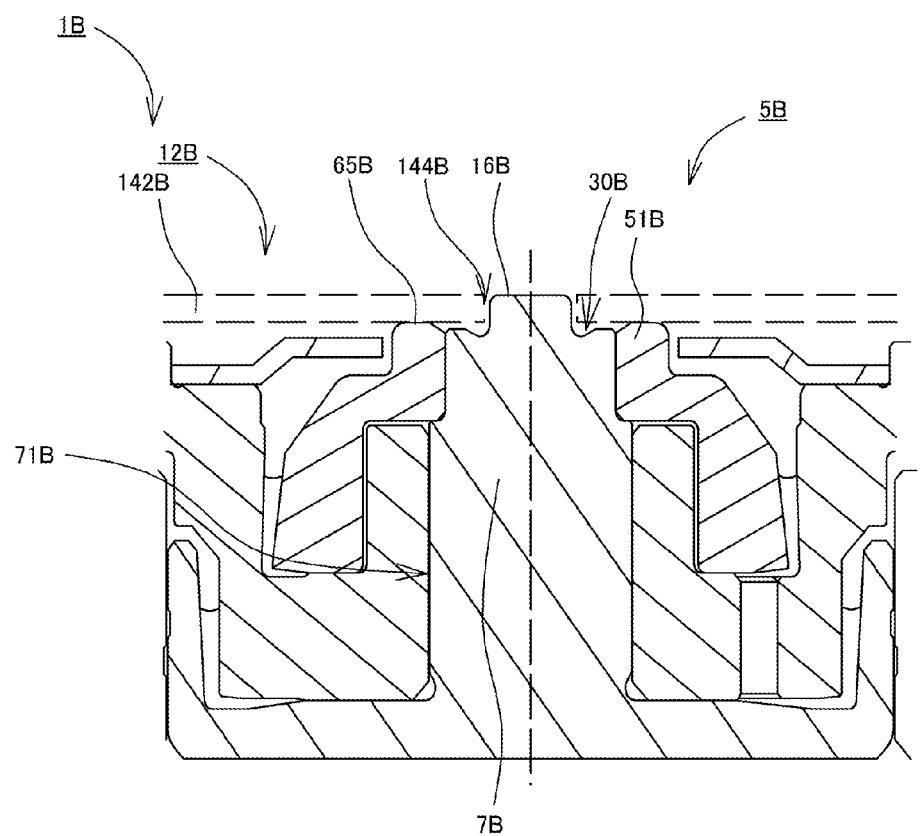
FIG. 10 is a cross-sectional view of a spindle motor according to a modified example of a preferred embodiment of the present invention.

FIG. 10 is a cross-sectional view of a motor 12B according to a modified example of a preferred embodiment of the present invention. In the motor 12B, an annular surface 65B arranged to come into contact with the cover member is defined by the upper end surface of an upper cup portion 5B. Specifically, the annular surface 65B is defined by the upper surface of an inner upper cylindrical portion 51B. An upper protrusion 16B protrudes upward from the radial inner side of the annular surface 65B. That is, the upper protrusion 16B is a portion protruding upward from the upper surface of a shaft portion 7B. The upper protrusion 16B is a portion arranged to be fixed to the cover inner circumferential surface defining the cover penetrating hole of the cover member. In a disk drive apparatus 1B, the upper protrusion 16B is fixed into a cover penetrating hole 144B of a cover member 142B. In the motor 12B, since the upper protrusion 16B is included, a screw arranged to fix the stationary shaft to the cover member becomes unnecessary. Therefore, according to the motor 12B, a reduction in thickness can be achieved in addition to securing the axial length of a radial gap 71B of the motor 12B. Accordingly, in the disk drive apparatus 1B, higher capacity and a reduction in thickness can be achieved.

In this modified example of a preferred embodiment of the present invention, a groove portion 30B recessed in an annular pattern is provided between the annular surface 65B and the upper protrusion 16B. Specifically, the groove portion 30B is provided between an inner end portion of the upper surface of the shaft portion 7B and a lower end portion of the outer circumferential surface of the upper protrusion 16B. Since the groove portion 30B is provided, in a case where burrs exist in the vicinity of a lower end portion of the inner circumferential surface defining the cover penetrating hole of the cover member, the burrs can be accommodated in the groove portion 30B. Therefore, in the disk drive apparatus 1B, the cover member 142B can be accurately supported. Further, in a case where the cover member 142B is bonded and fixed to the upper protrusion 16B, the groove portion 30B functions as an adhesive retaining portion. As a result, in the disk drive apparatus 1B, it is possible to solidly fix the cover member 142B.

Figure 11:
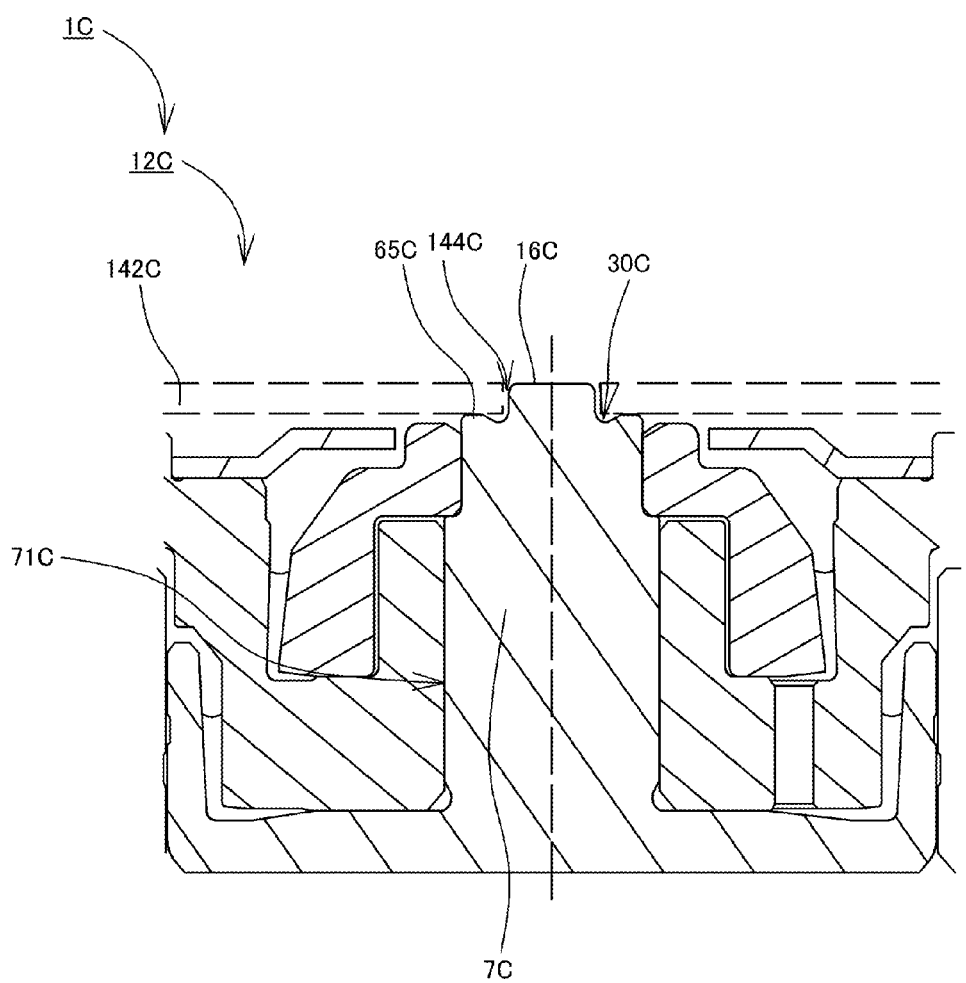
FIG. 11 is a cross-sectional view of a spindle motor according to another modified example of a preferred embodiment of the present invention.

FIG. 11 is a cross-sectional view of a motor 12C according to another modified example of a preferred embodiment of the present invention. In the motor 12C, an annular surface 65C arranged to come into contact with the cover member is defined by the upper surface of a shaft portion 7C. An upper protrusion 16C protrudes upward from the radial inner side of the annular surface 65C. That is, the upper protrusion 16C is a portion protruding upward from the upper surface of the shaft portion 7C. The upper protrusion 16C is a portion arranged to be fixed to the cover inner circumferential surface defining the cover penetrating hole of the cover member. In a disk drive apparatus 1C, the upper protrusion 16C is fixed into a cover penetrating hole 144C of a cover member 142C. In the motor 12C, since the upper protrusion 16C is included, a screw arranged to fix the stationary shaft to the cover member becomes unnecessary. Therefore, according to the motor 12C, a reduction in thickness can be achieved in addition to securing the axial length of a radial gap 71C of the motor 12C. Accordingly, in the disk drive apparatus 1C, higher capacity and a reduction in thickness can be achieved.

In this modified example, a groove portion 30C recessed in an annular pattern is provided between the annular surface 65C and the upper protrusion 16C. Specifically, the groove portion 30C is provided between an inner end portion of the upper surface of the shaft portion 7C and a lower end portion of the outer circumferential surface of the upper protrusion 16C. Since the groove portion 30C is provided, in a case where burrs exist in the vicinity of a lower end portion of the inner circumferential surface defining the cover penetrating hole of the cover member, the burrs can be accommodated in the groove portion 30C. Therefore, in the disk drive apparatus 1C, the cover member 142C can be accurately supported. Further, in a case where the cover member 142C is bonded and fixed to the upper protrusion 16C, the groove portion 30C functions as an adhesive retaining portion. As a result, in the disk drive apparatus 1C, it is possible to solidly fix the cover member 142C.

Exemplary preferred embodiments and modified examples of preferred embodiments have been described above. However, the present invention is not limited to the preferred embodiments and modified examples of preferred embodiments described above.

For example, the upper cup portion and the shaft portion may also be provided as a single monolithic member, if so desired. In this case, in the disk drive apparatus, even if an impact from the outside is applied to the upper cup portion through the cover member, position shift of the upper cup portion with respect to the shaft portion does not occur. Therefore, in the disk drive apparatus, the cover member can be accurately supported. In a case where the upper cup portion and the shaft portion are defined as a single monolithic member, the lower cup portion and the shaft portion may also be provided as separate members.

An adhesive arranged to fix the stationary shaft to the cover member is not limited to an ultraviolet curing adhesive and may also be an externally stimulated curing adhesive. The externally stimulated curing adhesive includes at least one of an acrylic adhesive and an epoxy nature adhesive, for example.

In the disk drive apparatus, the upper protrusion may also be fixed to the cover member by a method other than adhesion fixing. For example, the upper protrusion may also be fixed to the cover member by press-fitting the upper protrusion to the cover inner circumferential surface.

Figure 12:
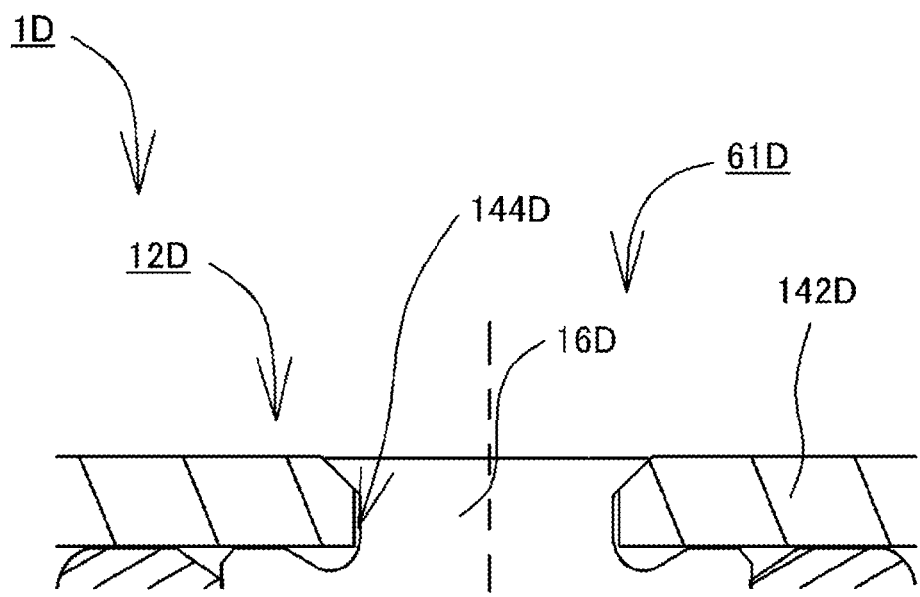
FIG. 12 is an enlarged cross-sectional view showing the vicinity of an upper portion of a stationary shaft of a spindle motor according to another modified example of a preferred embodiment of the present invention.

The upper protrusion may also be fixed to the cover inner circumferential surface by, for example, caulking. In a case where the upper protrusion is fixed to the cover member by caulking, for example, as in FIG. 12, a disk drive 1D with a motor 12D is provided with at least an upper portion of the cover inner circumferential surface defining a cover penetrating hole 144D of a cover member 142D which is inclined outward in the radial direction as it heads upward, whereby an upper protrusion 16D of a stationary shaft 61D can be prevented from protruding further upward than the upper surface of the cover member 142D. Further, even in a case where the upper protrusion 16D protrudes further upward than the upper surface of the cover member 142D, it is possible to make a protrusion height from the upper surface of the cover member 142D small.

The upper protrusion may also be fixed to the cover member by, for example, welding. In this case, preferably, the stationary shaft and the cover member are made of stainless steel.

Further, the upper protrusion may also be fixed to the cover member by, for example, press-fitting, caulking, welding and then adhesion, etc. In this way, in the disk drive apparatus, infiltration of dust or dirt into an internal space of the housing can be more effectively prevented.

The cover penetrating hole may also be covered by disposing a sheet-shaped member having a diameter larger than the cover inner circumferential surface on the upper surface of the cover member. In this way, in the disk drive apparatus, infiltration of dust or dirt into the internal space of the housing can be effectively prevented.

In the disk drive apparatus, an adhesive may also be interposed between the annular surface and the cover member. In this case, the annular surface comes into indirect contact with the cover member. In this way, in the disk drive apparatus, infiltration of dust or dirt into the internal space of the housing can be more effectively prevented.

The configurations in the preferred embodiments and each modified example described above may be appropriately combined unless they are inconsistent with each other.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor which is for use in a disk drive apparatus which includes a housing including a base member and a cover member, the spindle motor comprising:
    a stationary portion; and
    a rotating portion which is rotatably supported with respect to the stationary portion; wherein
    the stationary portion includes:
        a stationary shaft arranged along a central axis extending in a vertical direction; and
        a base member which directly or indirectly fixes the stationary shaft;
    the rotating portion includes a sleeve portion including an inner circumferential surface which defines a bearing hole penetrating in an axial direction;
    the stationary shaft is disposed in the bearing hole;
    a gap is defined between an outer circumferential surface of the stationary shaft and an inner circumferential surface of the sleeve portion;
    the gap is filled with lubricating oil;
    a dynamic pressure generating groove array is provided in at least one of the outer circumferential surface of the stationary shaft and the inner circumferential surface of the sleeve portion to define the gap;
    the stationary shaft includes:
        an annular surface arranged to come into direct or indirect contact with the cover member, the annular surface being located higher than the sleeve portion and extending in a circumferential direction; and
        an upper protrusion arranged to be fixed to a cover inner circumferential surface defining a cover penetrating hole of the cover member, the upper protrusion protruding upward from the radial inner side of the annular surface; and
    the base member includes a fixing portion arranged to directly or indirectly fix the cover member.

2. The spindle motor according to claim 1, wherein the stationary shaft further comprises:
    a shaft portion which is inserted into the bearing hole and which defines the gap between the shaft portion and the inner circumferential surface of the sleeve portion; and
    an upper cup portion extending outward in a radial direction from an upper portion of the shaft portion; and
    the upper cup portion is press-fitted to the shaft portion.

3. The spindle motor according to claim 1, wherein the stationary shaft further comprises:
    a shaft portion which is inserted into the bearing hole and which defines the gap between the shaft portion and the inner circumferential surface of the sleeve portion; and
    an upper cup portion extending outward in the radial direction from an upper portion of the shaft portion; and
    the upper cup portion is bonded to the shaft portion.

4. The spindle motor according to claim 2, wherein the annular surface is provided at the upper cup portion.

5. The spindle motor according to claim 2, wherein the annular surface is provided at the shaft portion.

6. The spindle motor according to claim 2, wherein the annular surface is provided at the shaft portion and the upper cup portion.

7. The spindle motor according to claim 2, wherein the shaft portion and the upper cup portion are defined by a single monolithic member.

8. The spindle motor according to claim 1, wherein a groove portion recessed in an annular pattern is provided between the annular surface and the upper protrusion.

9. A disk drive apparatus comprising:
    a housing including a base member and a cover member; and
    a spindle motor; wherein
    the cover member includes a cover penetrating hole and a fixing portion which is fixed to the base member;
    the spindle motor includes:
        a stationary portion; and
        a rotating portion which is rotatably supported with respect to the stationary portion;
    the stationary portion includes a stationary shaft which is arranged along a central axis extending in a vertical direction and is directly or indirectly fixed to the base member;
    the rotating portion includes a sleeve portion that includes an inner circumferential surface which defines a bearing hole penetrating in an axial direction;
    the stationary shaft is disposed in the bearing hole;
    a gap is defined between an outer circumferential surface of the stationary shaft and an inner circumferential surface of the sleeve portion;
    the gap is filled with lubricating oil;
    a dynamic pressure generating groove array is provided in at least one of the outer circumferential surface of the stationary shaft and the inner circumferential surface of the sleeve portion to define the gap;
    the stationary shaft includes:

an annular surface which is located higher than the sleeve portion and extends in a circumferential direction; and an upper protrusion protruding upward from the radial inner side of the annular surface;

the annular surface comes into direct or indirect contact with the cover member; and the upper protrusion is fixed to a cover inner circumferential surface defining the cover penetrating hole of the cover member.

10. The disk drive apparatus according to claim 9, wherein the upper protrusion faces the cover inner circumferential surface with a clearance interposed therebetween.

11. The disk drive apparatus according to claim 9, wherein the upper protrusion is press-fitted to the cover inner circumferential surface.

12. The disk drive apparatus according to claim 9, wherein the upper protrusion is caulked and fixed to the cover inner circumferential surface.

13. The disk drive apparatus according to claim 9, wherein the stationary shaft is fixed to the cover member by an adhesive.

14. The disk drive apparatus according to claim 9, wherein an adhesive is arranged between the upper protrusion and the cover inner circumferential surface.

15. The disk drive apparatus according to claim 13, wherein the adhesive is an ultraviolet curing adhesive or an externally stimulated curing adhesive.

16. The disk drive apparatus according to claim 15, wherein the externally stimulated curing adhesive includes at least one of an acrylic adhesive and an epoxy nature adhesive.

17. The disk drive apparatus according to claim 9, wherein the upper protrusion is welded to the cover member.

18. The disk drive apparatus according to claim 17, wherein the stationary shaft and the cover member are made of stainless steel.

19. The disk drive apparatus according to claim 9, wherein a sheet-shaped member is disposed on the upper surface of the cover member, the sheet-shaped member having a diameter greater than the cover inner circumferential surface and covering the cover penetrating hole.

20. The disk drive apparatus according to claim 9, wherein the stationary shaft further includes:

a shaft portion which is disposed in the bearing hole and which defines the gap between the shaft portion and the inner circumferential surface of the sleeve portion; and an upper cup portion extending outward in a radial direction from an upper portion of the shaft portion; and the upper cup portion is press-fitted to the shaft portion.

21. The disk drive apparatus according to claim 9, wherein the stationary shaft further includes:

a shaft portion which is disposed in the bearing hole and which defines the gap between the shaft portion and the inner circumferential surface of the sleeve portion; and an upper cup portion extending outward in the radial direction from an upper portion of the shaft portion; and the upper cup portion is bonded to the shaft portion.

22. The disk drive apparatus according to claim 21, wherein the annular surface is provided at the upper cup portion.

23. The disk drive apparatus according to claim 21, wherein the annular surface is provided at the shaft portion.

24. The disk drive apparatus according to claim 21, wherein the annular surface is provided at the shaft portion and the upper cup portion.

25. The disk drive apparatus according to claim 21, wherein the shaft portion and the upper cup portion are defined by a single monolithic member.

26. The disk drive apparatus according to claim 9, wherein a groove portion recessed in an annular pattern is provided between the annular surface and the upper protrusion.

27. The disk drive apparatus according to claim 9, wherein the fixing portion is defined by at least one of a welded portion, a threaded portion, and a caulked portion.

* * * * *